United States Patent
Tanibata

(10) Patent No.: US 12,008,676 B2
(45) Date of Patent: Jun. 11, 2024

(54) VEHICLE DEVICE, DRAWING REQUESTS USING PRIORITY QUEUES, AND VEHICLE DEVICE CONTROL METHOD

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 17/498,888

(22) Filed: Oct. 12, 2021

(65) Prior Publication Data
US 2022/0028029 A1  Jan. 27, 2022

Related U.S. Application Data

(63) Continuation of application No. PCT/JP2020/015033, filed on Apr. 1, 2020.

(30) Foreign Application Priority Data

Apr. 16, 2019  (JP) ................. 2019-077778

(51) Int. Cl.
*G06T 1/20* (2006.01)
*B60K 35/00* (2006.01)
(Continued)

(52) U.S. Cl.
CPC ............... *G06T 1/20* (2013.01); *B60K 35/00* (2013.01); *G06F 3/1423* (2013.01); *B60K 35/22* (2024.01);
(Continued)

(58) Field of Classification Search
None
See application file for complete search history.

(56) References Cited

U.S. PATENT DOCUMENTS 5,757,268 A * 5/1998 Toffolo .............. G01C 21/3626
340/459
6,119,217 A * 9/2000 Suzuoki ................ G06F 9/5027
345/522
(Continued)

FOREIGN PATENT DOCUMENTS

JP  H07244572 A  9/1995
JP  2008015638 A  1/2008
(Continued)

OTHER PUBLICATIONS

Schnitzer et al, 'Real-time Scheduling for 3D GPU Rendering', 2016 11th Symposium on Industrial Embedded Systems (SIES). (Year: 2016).*

(Continued)

*Primary Examiner* — Patrick F Valdez
(74) *Attorney, Agent, or Firm* — Harness, Dickey & Pierce, P.L.C.

(57) ABSTRACT

According to an embodiment, a vehicle device where drawing is executed by a plurality of applications includes a GPU that executes drawing based on a drawing request from the plurality of applications, a normal queue to which a drawing request for the GPU is input, and a priority queue to which a drawing request of preferentially executing processing over the normal queue is input. The GPU is configured to process the drawing request input to the normal queue in a round-robin fashion while preferentially processing the drawing request input to the priority queue.

13 Claims, 17 Drawing Sheets

(51) Int. Cl.
*G06F 3/14* (2006.01)
*B60K 35/22* (2024.01)
*B60K 35/28* (2024.01)

(52) U.S. Cl.
CPC ........ *B60K 35/28* (2024.01); *B60K 2360/178* (2024.01)

(56) References Cited

U.S. PATENT DOCUMENTS

| | | | |
|---|---|---|---|
| 2006/0271348 A1* | 11/2006 | Rossow | G06F 9/45537 703/26 |
| 2010/0002014 A1* | 1/2010 | Sakamoto | G09G 5/363 345/629 |
| 2010/0082944 A1* | 4/2010 | Adachi | G06F 9/3867 712/E9.049 |
| 2010/0274412 A1 | 10/2010 | Saito et al. | |
| 2013/0031552 A1* | 1/2013 | Kato | G06F 9/45558 718/1 |
| 2014/0192072 A1* | 7/2014 | Negishi | G06T 11/203 345/522 |
| 2015/0151689 A1 | 6/2015 | Kimura et al. | |
| 2015/0317948 A1 | 11/2015 | Takagi | |
| 2016/0328272 A1* | 11/2016 | Ahmed | G06F 9/4881 |
| 2018/0251031 A1* | 9/2018 | Liebau | B60K 37/02 |
| 2018/0322849 A1 | 11/2018 | Itou | |
| 2019/0005702 A1 | 1/2019 | Takimoto et al. | |
| 2019/0009796 A1* | 1/2019 | Fujii | B60W 40/08 |

FOREIGN PATENT DOCUMENTS

| | | |
|---|---|---|
| JP | 2008289030 A | 11/2008 |
| JP | 2010257134 A | 11/2010 |
| JP | 2014021833 A | 2/2014 |
| JP | 2014144750 A | 8/2014 |
| JP | 2014182602 A | 9/2014 |
| JP | 2015041199 A | 3/2015 |
| JP | 2016061837 A | 4/2016 |
| JP | 2017091378 A | 5/2017 |
| WO | WO-2017033289 A1 | 3/2017 |

OTHER PUBLICATIONS

Gansel et al, 'An Access Control Concept for Novel Automotive HMI Systems', SACMAT'14. (Year: 2014).*
Lee et al, 'VADI: GPU Virtualization for an Automotive Platform', IEEE Trans. Industrial Informatics, 12(1). (Year: 2016).*
Puthoor et al, 'Oversubscribed Command Queues in GPUs', GPGPU-11. (Year: 2018).*

* cited by examiner

COMPARATIVE EXAMPLE

EMBODIMENT

FIG. 17

FOR EACH APPLICATION

|  | PRIORITY |
|---|---|
| METER APPLICATION | 1 |
| NAVIGATION APPLICATION | 3 |
| SAFETY APPLICATION | 2 |
| HUD APPLICATION | 2 |
| VIDEO APPLICATION | 4 |
| ... | ... |

FIG. 18

FOR EACH OS

|  | PRIORITY |
|---|---|
| OS(A) | 1 |
| OS(B) | 2 |
| ... | ... |

FIG. 19

FOR EACH MODULE

|  | PRIORITY |
|---|---|
| CPU MODULE (A) | 1 |
| CPU MODULE (B) | 2 |
| ... | ... |

FOR EACH CORE

| | | PRIORITY |
|---|---|---|
| CPU MODULE (A) | CORE | 1 |
| | CORE | 2 |
| | CORE | 3 |
| | CORE | 4 |
| CPU MODULE (B) | CORE | 1 |
| | CORE | 2 |
| | CORE | 2 |
| | CORE | 3 |

FOR EACH CPU

|  | PRIORITY |
|---|---|
| CPU(A) | 1 |
| CPU(B) | 2 |
| ... | ... |

FIG. 20

FOR EACH DISPLAY DEVICE

|  | PRIORITY |
|---|---|
| METER DISPLAY | 1 |
| CENTER DISPLAY | 3 |
| HEAD-UP DISPLAY | 2 |
| ... | ... |

VEHICLE DEVICE, DRAWING REQUESTS USING PRIORITY QUEUES, AND VEHICLE DEVICE CONTROL METHOD

CROSS REFERENCE TO RELATED APPLICATIONS

This application is a continuation application of International Patent Application No. PCT/JP2020/015033 filed on Apr. 1, 2020, which designated the U.S. and claims the benefit of priority from Japanese Patent Application No. 2019-077778 filed on Apr. 16, 2019. The entire disclosure of all of the above application is incorporated herein by reference.

TECHNICAL FIELD

The present disclosure relates to a vehicle device and a vehicle device control method.

BACKGROUND ART

In the vehicle device, a meter display capable of full graphic display such as a speedometer may be adopted. For example, an image displayed on a meter display is divided into a portion requiring a short update period and other portions, and the portion requiring the short update period is processed by a CPU, thereby reducing a load at the time of updating the image.

SUMMARY

In one aspect of the present disclosure, a vehicle device in which drawing is executed by a plurality of application programs includes a graphic processing unit that executes drawing based on a drawing request from the plurality of application programs, a normal queue to which a drawing request for the graphic processing unit is input, and a priority queue to which a drawing request of preferentially executing processing over the normal queue is input. The graphic processing unit is configured to process the drawing request input to the normal queue in a round-robin fashion while preferentially processing the drawing request input to the priority queue.

BRIEF DESCRIPTION OF DRAWINGS

FIG. 17 is a diagram showing an example of priorities for applications according to a third embodiment.

FIG. 18 is a diagram showing an example of priorities for OSs.

FIG. 19 is a diagram showing an example of priorities for CPU modules and cores.

FIG. 20 is a diagram showing an example of priorities for display devices.

DESCRIPTION OF EMBODIMENTS

Figure 1:
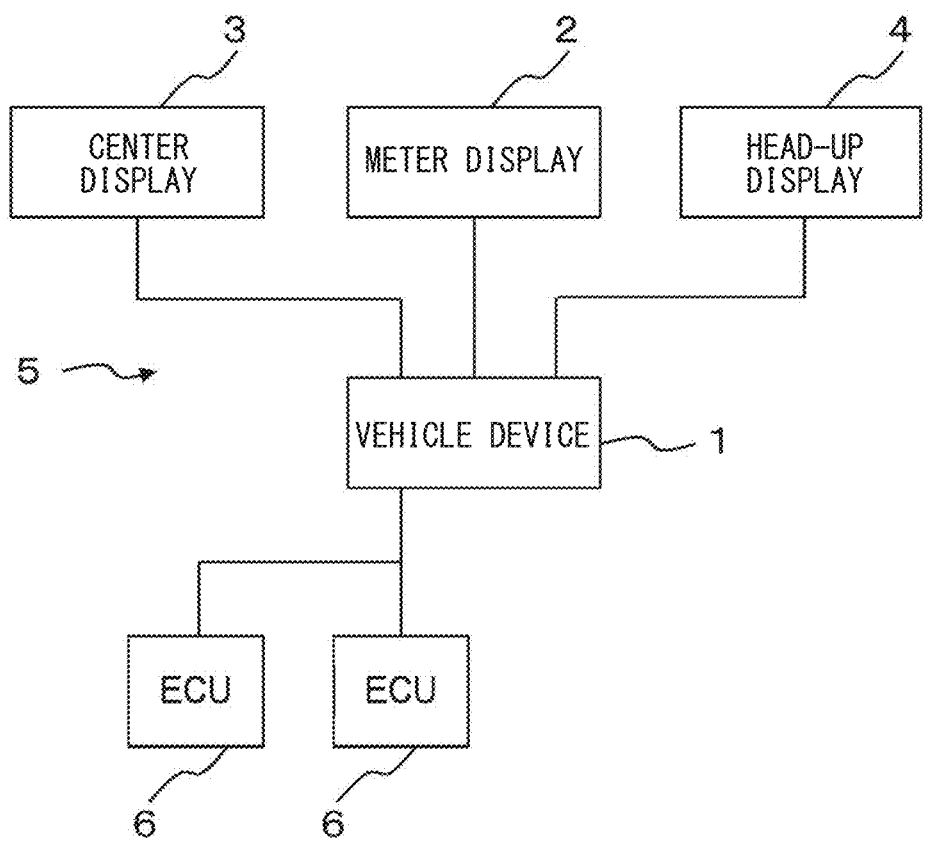
FIG. 1 is a diagram showing a configuration example of a cockpit system according to a first embodiment.

To begin with, a relevant technology will described first only for understanding the following embodiments.

In recent years, different contents may be displayed on one display device, or multiple display devices may be controlled by a single vehicle device. That is, in the vehicle device, drawing may be executed based on multiple application programs. In this case, although resources of the CPU and the graphic processing unit are shared by the multiple applications, since a display of a speed, a display of a warning, and the like require quick response, the processing, that is, the drawing needs to be executed in preference to the drawing of a so-called multimedia system.

However, if the drawing of the speed or the warning is prioritized in all cases, the resources of the GPU for other application programs are insufficient, and as a result, a failure may occur in drawing based on a multimedia application program, for example, display of a navigation screen, display of a home screen, or the like.

One objective of the present disclosure is to provide a vehicle device and a vehicle device control method that can preferentially process drawing requiring quick response and reduce a risk of shortage of resources of a graphic processing unit for another piece of drawing.

As described above, in the present disclosure, a vehicle device in which drawing is executed by a plurality of application programs includes a graphic processing unit that executes drawing based on a drawing request from the plurality of application programs, a normal queue to which a drawing request for the graphic processing unit is input, and a priority queue to which a drawing request of preferentially executing processing over the normal queue is input. The graphic processing unit is configured to process the drawing request input to the normal queue in a round-robin fashion while preferentially processing the drawing request input to the priority queue.

As described above, by providing a normal queue and a priority queue in the graphic processing unit and executing preemption on the graphic processing unit, it is possible to restrict an increase in a load on a CPU side. Accordingly, a situation in which execution of another application program is hindered as a result of giving priority to processing of the application program on the CPU side can be avoided.

Since the graphic processing unit gives priority to a drawing request input to the priority queue, the graphic processing unit can quickly process the drawing to be preferentially processed. Since the drawing request input to the normal queue is processed in a round-robin fashion, the resources can be distributed uniformly and appropriately.

Therefore, even when the drawing is executed based on multiple application programs, the drawing requiring quick response can be preferentially processed, and the risk of shortage of the resources of the graphic processing unit for another piece of drawing can be reduced. A smooth display can be implemented in one display device or each display device.

Hereinafter, multiple exemplary embodiments will be described with reference to the drawings. In the following description, the same reference numerals are given to substantially the same portions according to the embodiments.

First Embodiment

Next, the first embodiment will be described. As shown in FIG. 1, the vehicle device 1 constitutes, for example, a cockpit system 5 including three display devices which are a meter display 2, a center display 3, and a head-up display 4.

The meter display 2 is, for example, a liquid crystal display or an organic EL display, and is assumed to be provided in the vicinity of the front of a driver on a dashboard. The center display 3 is, for example, a liquid crystal display or an organic EL display, and is assumed to be provided in the vicinity of a center console. As will be described later, the meter display can display a speed, a warning, and the like in a so-called full graphic display.

The head-up display 4 is, for example, a liquid crystal display, an organic EL display, or a projector that projects an image onto a front window, and is assumed to be provided in the vicinity of the front of the driver on the dashboard. However, the number, the arrangement, or the configuration of the display devices is merely an example, and the disclosure is not limited thereto.

Although FIG. 1 shows an example in which the vehicle device 1 is connected to multiple display devices, the vehicle device 1 according to the present embodiment solves a problem when drawing is executed based on multiple application programs (hereinafter referred to as applications) as will be described later. Therefore, the number of the display devices connected to the vehicle device 1 may be one or more.

The vehicle device 1 is communicably connected to some electronic control devices 6 (hereinafter referred to as ECUs 6) provided in a vehicle. Although the vehicle device 1 can also be considered as one of the ECUs 6, in the present specification, the vehicle device 1 and the ECU 6 are separated from each other in order to facilitate understanding.

Figure 2:
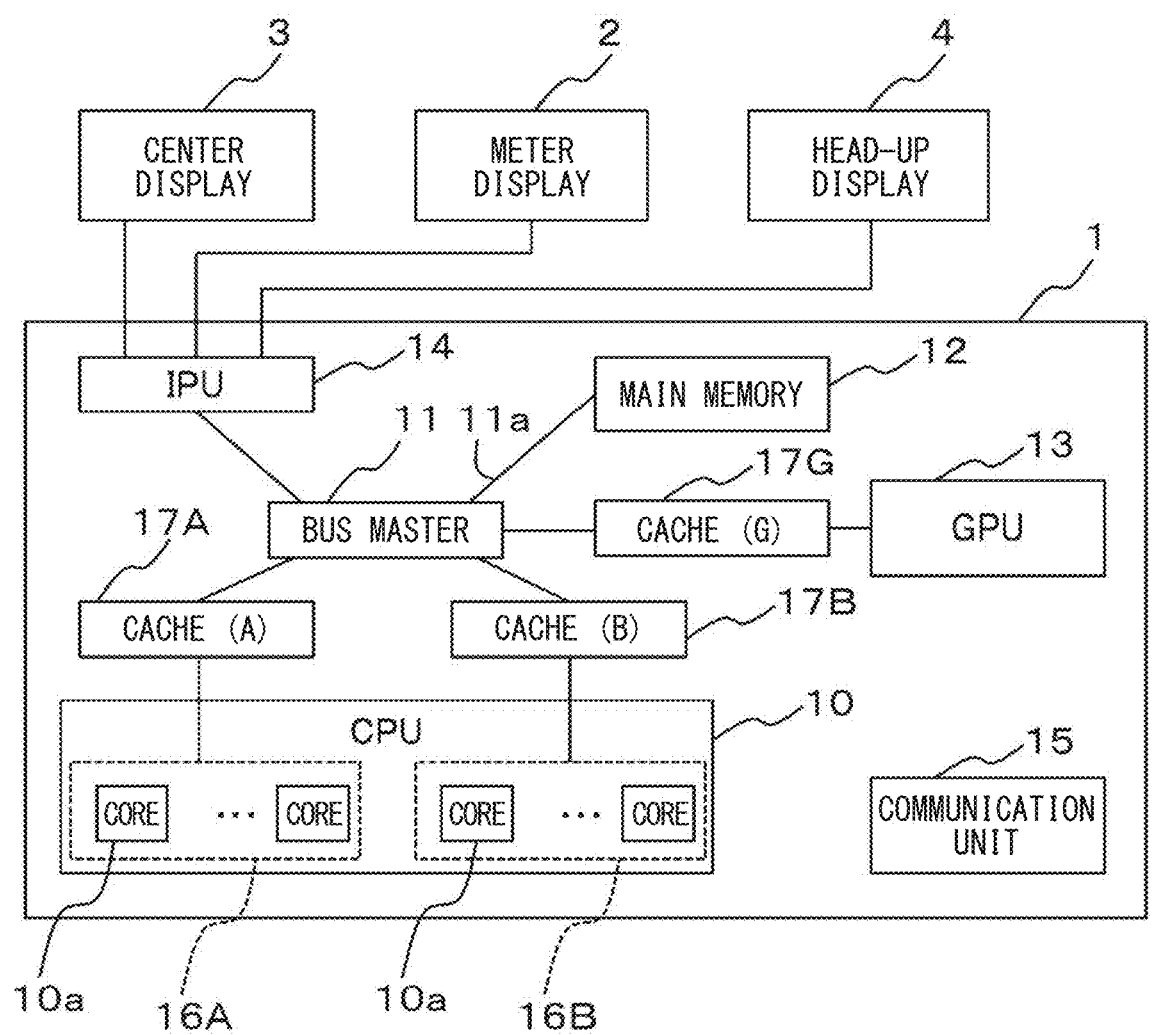
FIG. 2 is a diagram showing an electrical configuration example of a vehicle device.

As shown in FIG. 2, the vehicle device 1 includes a CPU 10, a bus master 11, a main memory 12, a graphic processing unit 13 (hereinafter, referred to as a GPU 13), an image processing unit 14 (hereinafter, referred to as an IPU 14), a communication unit 15, and the like.

Figure 9:
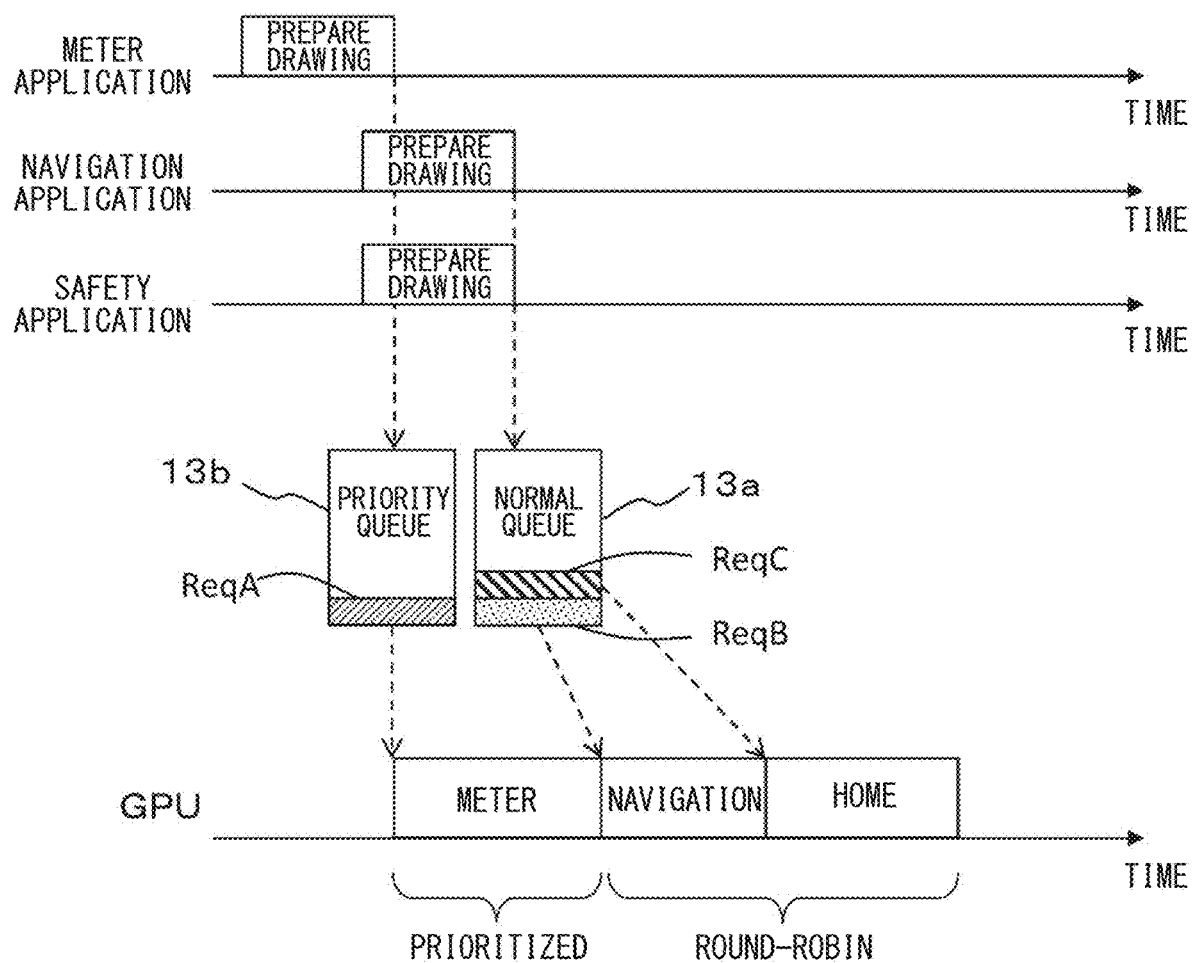
FIG. 9 is a diagram showing an example of an operation mode of a GPU.

The GPU 13 is a functional unit that actually draws a surface instructed by an application. That is, a drawing request, which will be described later, is received from the application to the GPU 13, and the GPU 13 draws the actual surface based on the drawing request. Here, the surface is image data that is a source of a content image displayed at a certain moment. As shown in FIG. 9 to be described later, the GPU 13 is provided with a normal queue 13a for inputting a drawing request and a priority queue 13b for inputting a drawing request to be preferentially processed.

The IPU 14 is a functional unit that reads a frame buffer and outputs the frame buffer to the display device as, for example, a video signal. That is, the content drawn on the frame buffer by the IPU 14 is transferred to the display device, and thereby the content is displayed on the display device. The IPU 14 does not need to output the content in the form of a video signal, and can be configured to output the content in a form of data and reproduce the content on a display device side.

The CPU 10 includes multiple cores 10a. Here, as an example, the number of the cores 10a is eight. The eight cores 10a are grouped by each four cores, and are allocated to two CPU modules 16A and 16B. That is, a plurality of CPU modules 16 capable of operating independently of one another in terms of functions are provided in the vehicle device 1.

The CPU module 16A is allocated to an application group 22A that relatively requires a real-time property, and the CPU module 16B is allocated to an application group 22B that does relatively not require the real-time property. Hereinafter, when a description common to the CPU module 16 is given, the CPU module 16 is simply referred to as the CPU module 16 without adding A or B.

Each of the CPU modules 16 and the GPU 13 is provided with a respective dedicated cache memory 17. Hereinafter, a unit provided for the CPU module 16A is referred to as a cache 17A for the sake of convenience, a unit provided for the CPU module 16B is referred to as a cache 17B for the sake of convenience, and a unit provided for the GPU 13 is referred to as a cache 17G for the sake of convenience. The cache memories 17 are connected to the main memory 12 and the IPU 14 via a bus 11a and the bus master 11, respectively, and are capable of transmitting and receiving data to and from the main memory 12 and the IPU 14.

The communication unit 15 communicates with another ECU 6. The communication unit 15 includes, for example, a controller area network interface. Depending on a type of the ECU 6, for example, a wireless communication method such as Wifi or a wired communication method such as USB may be adopted.

Figure 3:
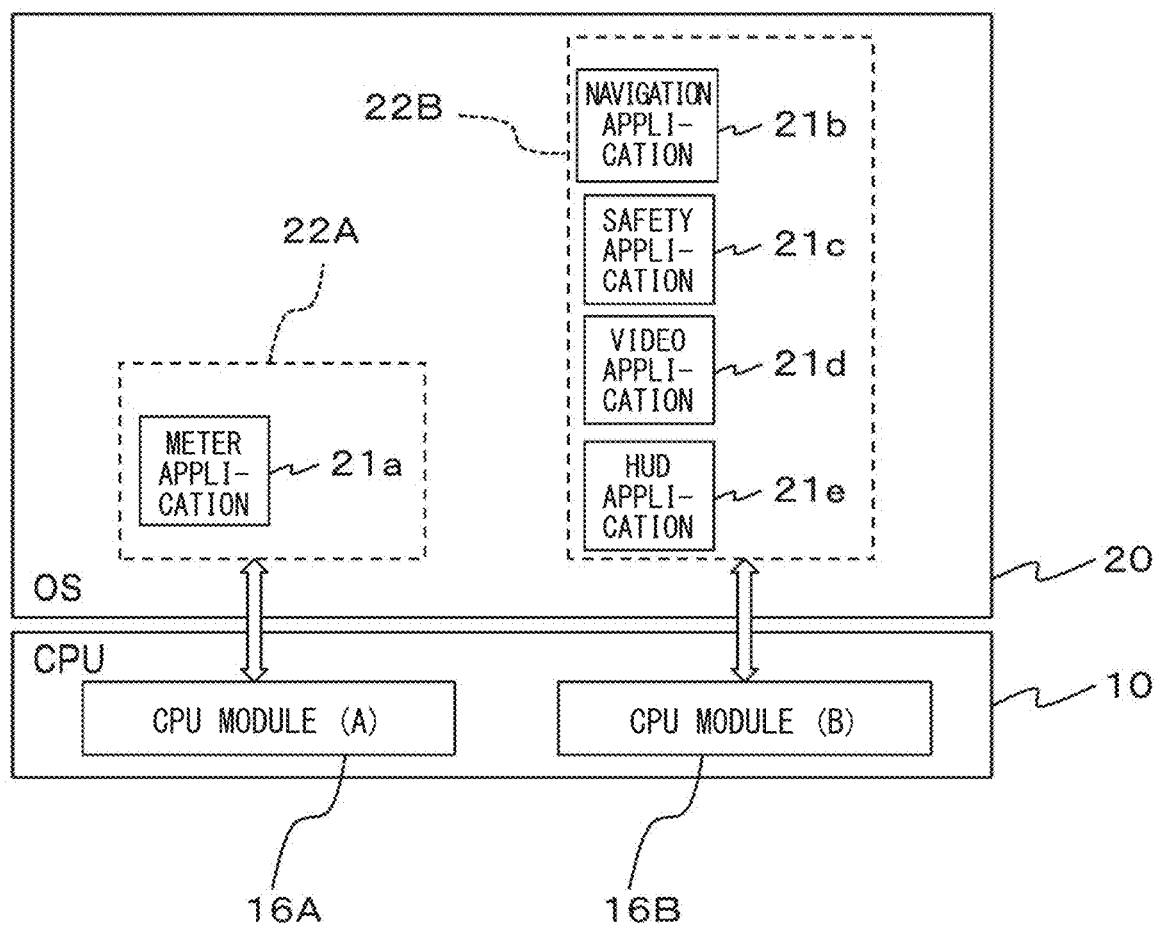
FIG. 3 is a diagram showing a software configuration example of the vehicle device.

As shown in FIG. 3, in the vehicle device 1, an operating system 20 (hereinafter, referred to as an OS 20) is executed on the CPU 10, and multiple applications 21 are executed on the OS 20. As the applications 21 executed on the OS 20, a meter application 21a, a navigation application 21b, a safety application 21c, a video application 21d, an HUD application 21e, and the like are provided. HUD is an abbreviation for head up display. The applications 21 are an example, and the applications 21 executed on the OS 20 are not limited thereto.

The meter application 21a notifies the user of a speed, the number of revolutions, a warning, or the like of the vehicle, and mainly draws the surface displayed on the meter display 2. For example, the meter application 21a draws, as the user interface 23 shown as a normal display mode in FIG. 4, the surface for displaying a content, such as a speedometer M1 and a tachometer M2 that serve as meters, or a warning light M3 serving as a tertail.

As described above, the GPU 13 actually takes charge of drawing, and the meter application 21a and the like output a drawing request to the GPU 13. However, in order to simplify the description, the expression is used here that the meter application 21a executes the drawing. Here, similar applies to the other applications 21.

The speedometer M1 includes an indicator image M1a, the display of which needs to be updated periodically and in real time in order to indicate a change in the speed of the vehicle, and a scale image M1b, the display of which is assumed to be less changed than that of the indicator image M1a. Similarly, the tachometer M2 includes an indicator image M2a, the display of which needs to be updated periodically and in real time in order to indicate a change in the number of rotations, and a scale image M1b, the display of which is assumed to be less changed than that of the indicator image M2a. In the case of the meter display 2, a background image MB is drawn in a layer different from the indicator image M1a, the scale image M1b, and the like. The images are examples.

However, the surface to be drawn by the meter application 21a can also be displayed on the center display 3 or the head-up display 4. The surface drawn by the meter application 21a is relatively required to have the real-time property as compared with the surface drawn by the other exemplified applications 21.

The navigation application 21b implements a navigation function and draws a surface mainly displayed on the center display 3. For example, as shown in FIG. 5, the navigation application 21b draws a surface for displaying a content such as a navigation screen M4 including a map, a current position of the vehicle, and the like. However, the surface drawn by the navigation application 21b can be displayed on the meter display 2 as a navigation display mode shown in FIG. 4, for example, and can also be displayed on the head-up display 4.

The safety application 21c implements various functions of displaying a menu and driving support, and draws a surface mainly displayed on the center display 3. For example, as shown in FIG. 5, the safety application 21c draws a surface for displaying a content such as a home screen M5 in which multiple icons are arranged for selecting a target function or a content. However, the surface drawn by the safety application 21c can be displayed on the meter display 2 as a menu display mode shown in FIG. 4, for example, and can also be displayed on the head-up display 4.

Figure 6:
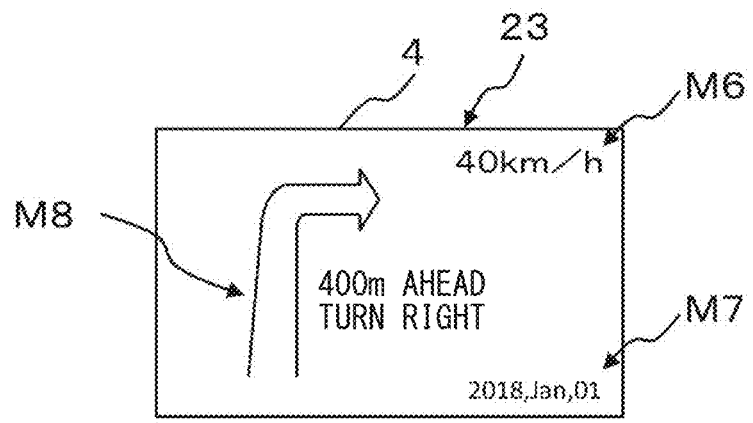
FIG. 6 is a diagram showing an example of a display mode of a head-up display.

The HUD application 21e notifies the user of, for example, a speed, a future course, and the like, and draws a surface mainly displayed on the head-up display 4. For example, as shown in FIG. 6, the HUD application 21e draws a surface for displaying current speed information M6, time information M7, or course information M8 indicating a distance to a corner, a turning direction, and the like. However, the surface drawn by the HUD application 21e can also be displayed on the meter display 2 or the center display 3.

Figure 7:
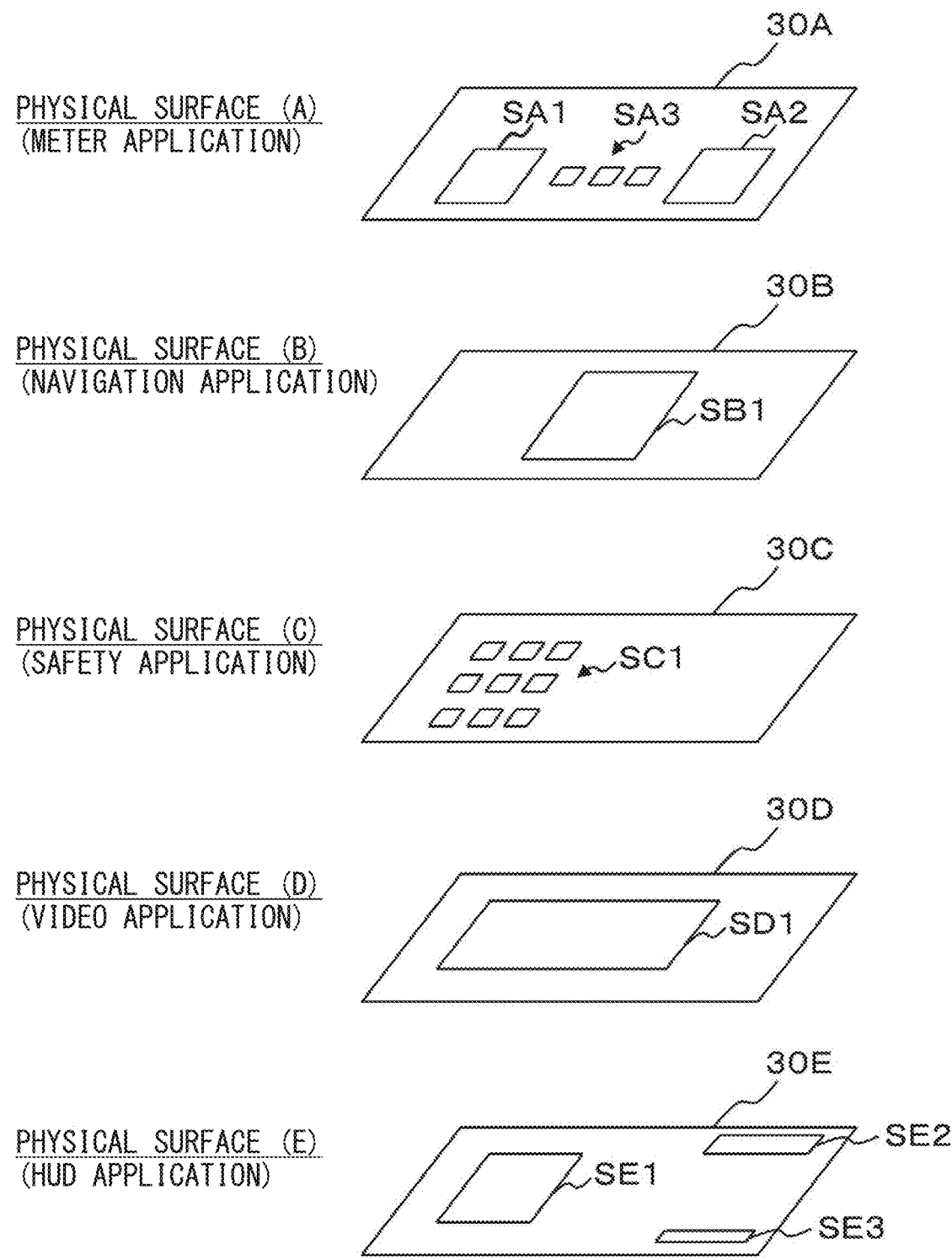
FIG. 7 is a diagram showing an example of a physical surface allocated to each application.

As shown in FIG. 7, a physical surface 30 for drawing the surface is individually allocated to the applications 21. That is, the application 21 functions as a drawing unit that draws a surface, which is a content holding unit, on the physical surface 30 allocated to the application 21. The application 21 corresponds to a synchronization unit that loads in a surface, which is a content holding unit, into the physical surface 30 allocated to the application 21 and that synchronizes the surface.

The physical surfaces 30 are secured in a size such that necessary surfaces can be drawn, that is, provided on the cache memory 17 or the main memory 12. A size of the physical surface 30 does not need to be equal to the number of pixels of the display device. The above is because a necessary surface is selected from the surfaces drawn on the physical surface 30 and displayed on the display device.

In the present embodiment, a physical surface 30A is allocated to the meter application 21a, a physical surface 30B is allocated to the navigation application 21b, a physical surface 30C is allocated to the safety application 21c, a physical surface 30D is allocated to the video application 21d, and a physical surface 30E is allocated to the HUD application 21e. Then, one or more surfaces are drawn on the physical surfaces 30 by the applications 21.

For example, surfaces SA1 to SA3 are drawn on the physical surface 30A by the meter application 21a. Similarly, a surface SB1 is drawn on the physical surface 30B by the navigation application 21b. Surfaces SC1 and SC2 are drawn on the physical surface 30C by the safety application 21c. In FIG. 7, for simplification of description, multiple surfaces drawn by the safety application 21c are collectively referred to as the surface SC1. A surface SD1 is drawn on the physical surface 30D by the video application 21d. Surfaces SE1 to SE3 are drawn on the physical surface 30E by the HUD application 21e. The above surfaces are examples.

At least one of the contents displayed on the display devices executes an animation operation. Here, the animation operation is a display mode in which a position and a size of an image indicating the content gradually change, the image rotates, the user interface 23 moves as a whole along with a swipe operation, the image gradually fades in or fades out, the color of the image changes, and the like.

Figure 4:
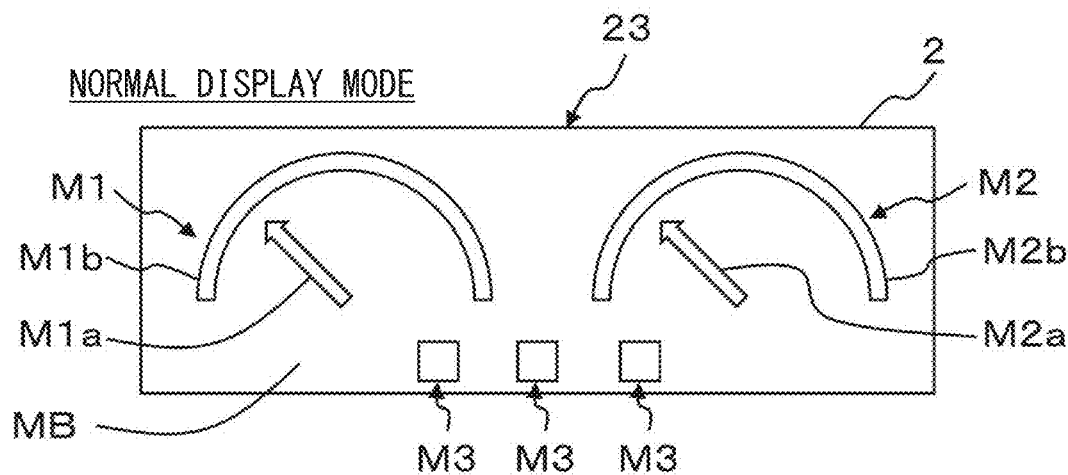
FIG. 4 is a diagram showing an example of a display mode of a meter display.
Figure 4:
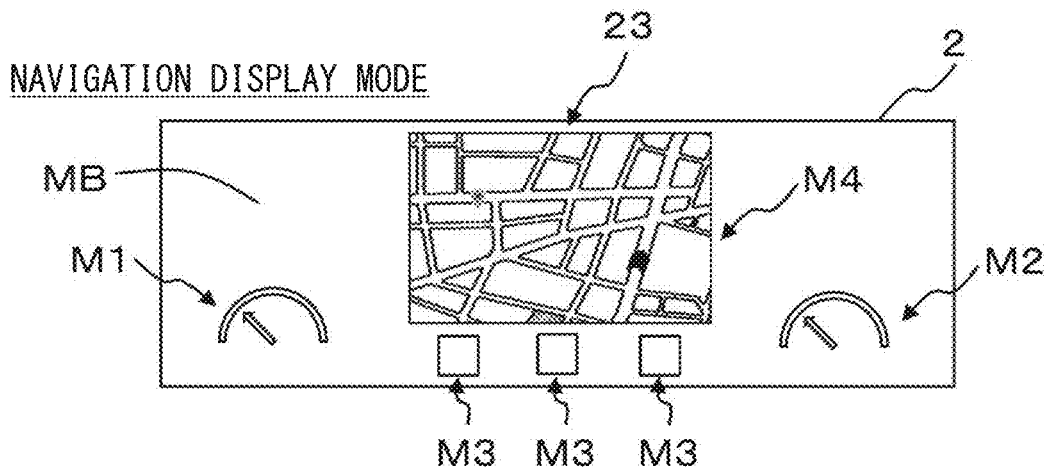
Figure 4:
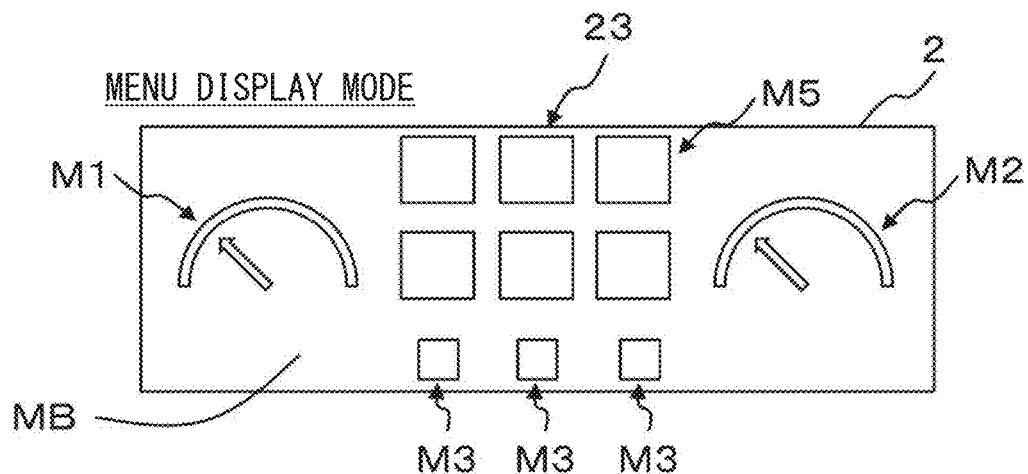
Figure 5:
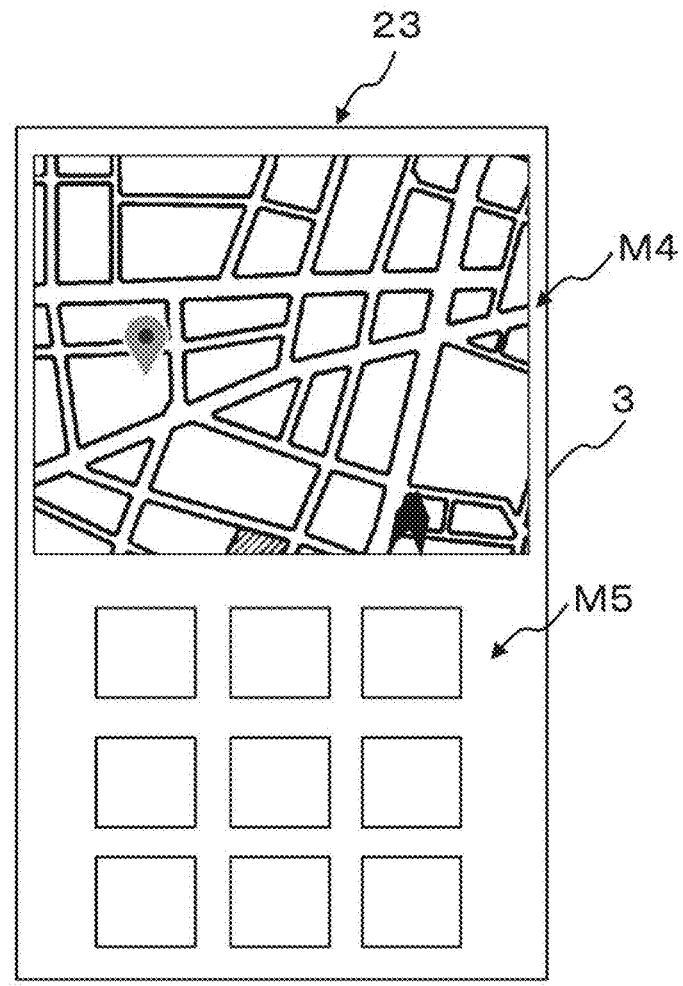
FIG. 5 is a diagram showing an example of a display mode of a center display.

For example, as shown in FIG. 4, the speedometer M1, the tachometer M2, a map, a menu, or the like are a content whose size and position change depending on a display mode or the display device at a display destination. However, the animation operation is not limited thereto, and any animation operation in which the display mode changes continuously or intermittently from a certain time point is included.

Next, an operation of the above-described configurations will be described.

The speedometer M1, the tachometer M2, or the warning light M3 described above is essential when the vehicle is used, and quick response is required for the display of the speedometer M1, the tachometer M2, or the warning light M3. For example, the speedometer M1 and the tachometer M2 are images that require periodic display update, such as 60 times per second, and require real-time update in accordance with a change in vehicle speed or the like. This is because if the display is not updated within 1/60 seconds, the indicator image M1a may appear to be stuck or may be not smoothly displayed.

Since the warning light M3 notifies, for example, a state in which the seat belt is not mounted or a state in which the door is not closed, when the states are detected, it is necessary to promptly update the display. That is, the warning light M3 is required for traveling of the vehicle, for example, it is necessary to execute processing, that is, drawing, in preference to drawing of a so-called multimedia system such as the navigation screen M4. The individual drawings are merely examples, and the drawing that requires quick response such as periodic update and real-time performance is not limited thereto.

On the other hand, the vehicle device 1 displays different contents on one display device such as the meter display 2, or controls multiple display devices according to the present embodiment. That is, the vehicle device 1 can display contents drawn by different applications 21. In the vehicle device 1, the multiple applications 21 share the resources of the CPU 10 and the GPU 13, and the multiple CPU modules share the resources of the GPU 13.

Therefore, if the GPU 13 preferentially processes a drawing request from, for example, the meter application 21*a*, even if another application 21 desires to use the GPU 13, there is a risk that the resources are insufficient and the drawing request can not be executed. Even if the speedometer M1, the warning light M3, and the like are smoothly displayed and updated, if the navigation screen M4 is not smoothly displayed or updated, smooth display is not executed from the viewpoint of the user.

That is, in the case of the vehicle device 1 in which the drawing is executed based on the multiple applications 21, for example, in a simple configuration in which the drawing request from the meter application 21*a* is prioritized, a failure may occur in the other applications 21.

Therefore, in the present embodiment, when the drawing is executed based on the multiple applications 21 as described below, it is possible to preferentially process the drawing requiring quick response, and to reduce the risk that the resources of the GPU 13 for another piece of drawing become insufficient. Although the following processing is executed by each application 21 and the GPU 13, for the sake of simplicity, the description will be made mainly on the vehicle device 1.

Figure 8:
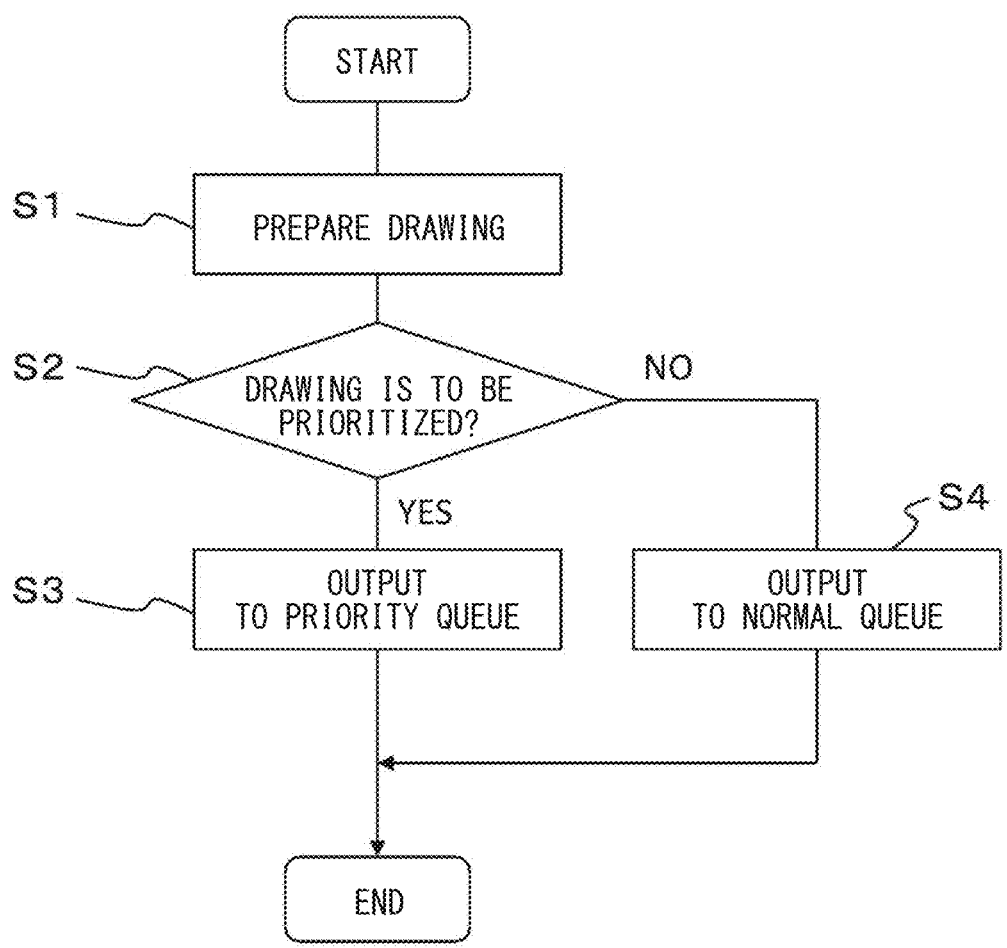
FIG. 8 is a diagram showing a flow of processing of requesting drawing.

When requesting the drawing, the vehicle device 1 executes the processing shown in FIG. 8, and prepares for the drawing in step S1. The drawing preparation is, briefly speaking, a step of preparing a size, a color, or the like for drawing a surface. Subsequently, in step S2, the vehicle device 1 determines whether the drawing is to be prioritized.

For example, when the drawing is executed based on the meter application 21*a*, the vehicle device 1 determines that the drawing is to be prioritized. The meter application 21*a* can also determine the priority by itself. In this case, since YES is determined in step S2, the vehicle device 1 outputs the drawing request to the priority queue 13*b*. That is, the drawing request to be prioritized is input to the priority queue 13*b*.

At this time, as shown in FIG. 9, the GPU 13 is provided with the normal queue 13*a* and the priority queue 13*b*. That is, the vehicle device 1 executes preemption on the GPU 13. Accordingly, an increase in the load on the CPU 10 side is restricted, and for example, a situation in which execution of another application 21 is hindered as a result of giving priority to the processing of the certain application 21 can be avoided.

Then, as ReqA shown in FIG. 9, the GPU 13 preferentially processes the drawing request input to the priority queue 13*b*. That is, in this case, the drawing of the surface requested by the meter application 21*a* is preferentially executed. Accordingly, the drawing request to be prioritized is quickly processed and the surface is drawn.

On the other hand, the vehicle device 1 determines that, for example, a drawing request of the navigation screen M4 from the navigation application 21*b* indicated as ReqB or drawing of the home screen M5 based on the safety application 21*c* indicated as ReqC is not a drawing to be prioritized since the priority is relatively low. The navigation application 21*b* or the safety application 21*c* can also determine the priority by itself. In this case, since NO is determined in step S2, the vehicle device 1 outputs the drawing request to the normal queue 13*a*. That is, a drawing request having a relatively low priority is input to the normal queue 13*a*.

Then, as shown in FIG. 9, the GPU 13 preferentially processes the drawing request input to the priority queue 13*b*, and then if there is a drawing request in the normal queue 13*a*, the GPU 13 processes the drawing request in the round-robin fashion (or a round-robin scheduling). That is, the GPU 13 sequentially executes processing on the drawing requests input to the normal queue 13*a* while allocating the resources in time series. Accordingly, in the drawing request input to the normal queue 13*a*, the resource is equally allocated and the surface is drawn.

As described above, the vehicle device 1 processes a drawing request when drawing is executed based on the multiple applications 21 by adopting a configuration in which the GPU 13 is provided with the normal queue 13*a* and the priority queue 13*b*, in other words, a configuration in which the preemption is executed on the GPU 13, in consideration of, when priority is given to one application 21, the influence on other applications 21.

According to the embodiment described above, following advantages can be attained.

The vehicle device 1 in which drawing is executed based on the multiple applications 21 includes the GPU 13 that executes drawing based on drawing requests from the multiple applications 21, the normal queue 13*a* to which a drawing request for the GPU 13 is input, and the priority queue 13*b* to which a drawing request to be processed more preferentially than that of the normal queue 13*a* is input. In the vehicle device 1, the GPU 13 gives priority to the drawing request input to the priority queue 13*b*, and the drawing request input to the normal queue 13*a* is processed in the round-robin format.

That is, at least one of the drawing requests from the multiple applications 21, the drawing requests from the multiple OSs 20, the drawing requests from the multiple CPU modules 16, the drawing requests from the multiple CPUs 10, the drawing requests from the multiple cores 10*a*, and the drawing requests corresponding to the multiple display devices is input to each of the normal queue 13*a* and the priority queue 13*b*.

In this way, by providing the normal queue 13*a* and the priority queue 13*b* for the GPU 13 to execute the preemption, when drawing is executed by the multiple applications 21, the resources of the CPU 10 for execution of the other applications 21 can be prevented from becoming insufficient as a result of giving priority to the one application 21.

Since the drawing request input to the priority queue 13*b* is prioritized, the GPU 13 can quickly process the drawing to be preferentially processed. Since the drawing request input to the normal queue 13*a* is processed under the round-robin fashion, the resources can be distributed uniformly and appropriately.

Therefore, even when the drawing is executed based on the multiple application programs, the drawing requiring quick response can be preferentially processed, and the risk of shortage of the resources of the GPU 13 for another piece of drawing can be reduced. As a result, smooth display can be implemented in one display device or each display device.

In the vehicle device 1 in which the drawing is executed based on the multiple applications 21, when the drawing is executed based on the drawing requests from the multiple applications 21, according to the control method of processing the drawing request input to the normal queue 13*a* in the round-robin fashion while giving priority to the drawing request input to the priority queue 13*b*, which is processed more preferentially than that of the normal queue 13*a*, between the drawing request input to the normal queue 13*a* and the drawing request input to the priority queue 13*b*, similarly, the drawing requiring quick response can be preferentially processed, and a risk that the resources of the GPU 13 for another piece of drawing is insufficient can be reduced.

In the case of the vehicle device 1, at least one of the multiple applications 21 inputs, to the priority queue 13b, a drawing request for an image that needs to be periodically updated. Accordingly, for example, the drawing request of the speedometer M1, the tachometer M2, or the like from the meter application 21a can be preferentially processed, and the display can be executed smoothly.

In the case of the vehicle device 1, at least one of the multiple applications 21 inputs a drawing request for an image for displaying a warning to the priority queue 13b. Accordingly, for example, the drawing request of the warning light M3 or the like from the meter application 21a can be preferentially processed, and a highly responsive display can be executed.

In the case of the vehicle device 1, a priority order is allocated to the multiple applications 21, a drawing request from the meter application 21a or the like having a relatively high priority order is input to the priority queue 13b, and a drawing request from, for example, the navigation application 21b having a relatively low priority order is input to the normal queue 13a. Accordingly, it is possible to simply manage the drawing request having a high priority and the drawing request having a relatively low priority.

Figure 10:
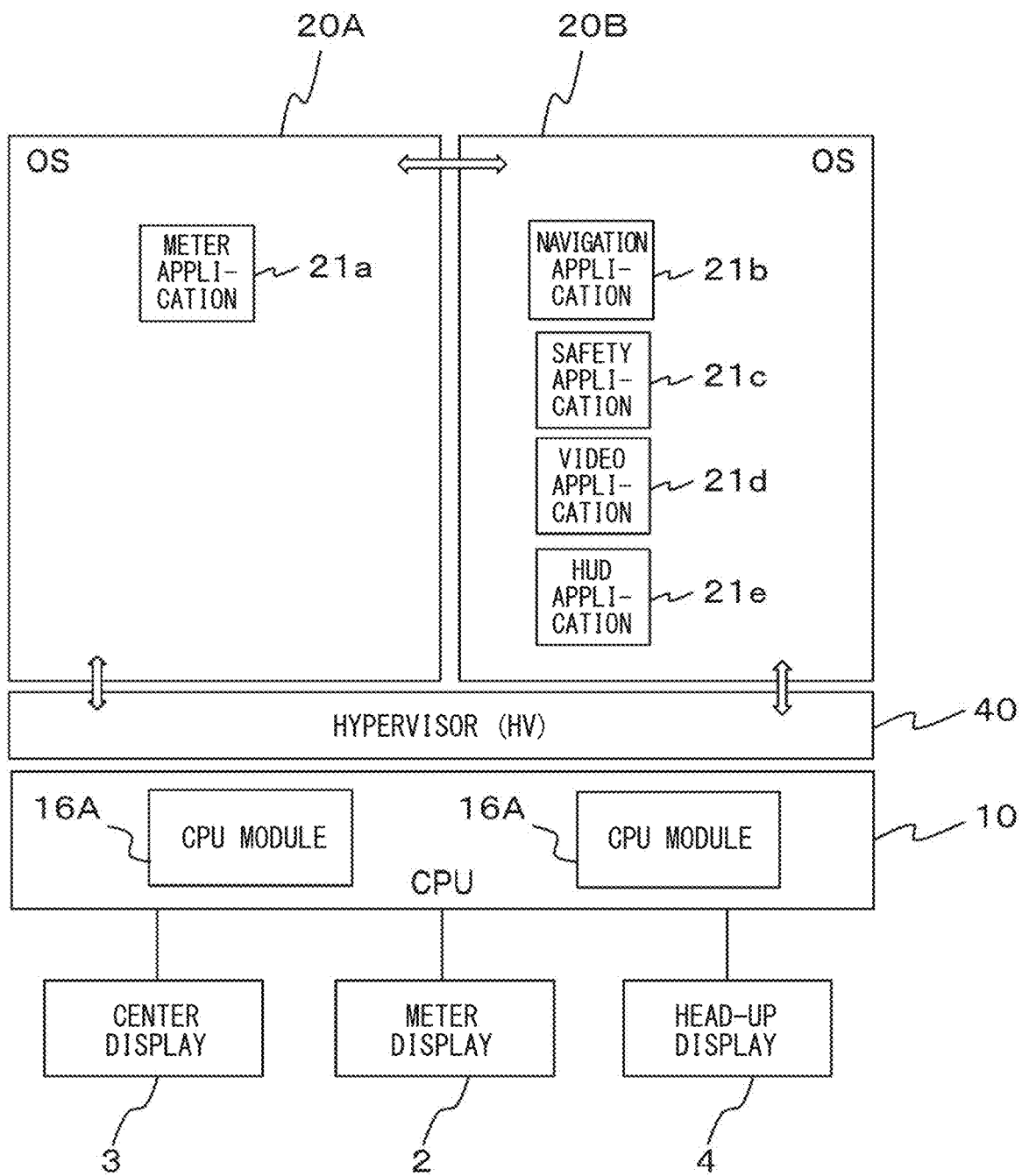
FIG. 10 is one diagram showing another configuration example of the vehicle device.

Although the configuration example in which one OS 20 is implemented in the vehicle device 1 has been described above, the vehicle device 1 may have a different configuration. For example, as shown in FIG. 10, in the vehicle device 1, the hypervisor 40 is executed on the CPU 10, and multiple, for example, two OSs 20A and 20B are executed on the hypervisor 40.

At this time, an OS 20A is allocated to the CPU module 16A, and an OS 20B is allocated to a CPU module 16B. In the present embodiment, it is assumed that the OS 20A is in charge of processing having a relatively high real-time property, and the OS 20B is in charge of processing having a relatively low real-time property.

For example, in the OS 20A, for example, a meter application 21a that requires the real-time property is executed, and in the OS 20B, a navigation application 21, a safety application 21c, a video application 21d, an HUD application 21e, and the like that do not require the real-time property as much as the OS 20A are executed. The type and the number of the OS 20 and the arrangement of the applications 21 are merely examples, and the present invention is not limited thereto.

Even when such a configuration is adopted, when the drawing is executed based on the multiple applications 21, the drawing requiring quick response can be preferentially processed, and the risk of shortage of the resources for another piece of drawing can be reduced. In this case, the hypervisor 40 can be executed as a function of the OS 20A. That is, the OS 20A can be executed on the CPU 10, the hypervisor 40 can be operated as a function of the OS 20, and the OS 20B can be executed on the hypervisor 40.

Figure 11:
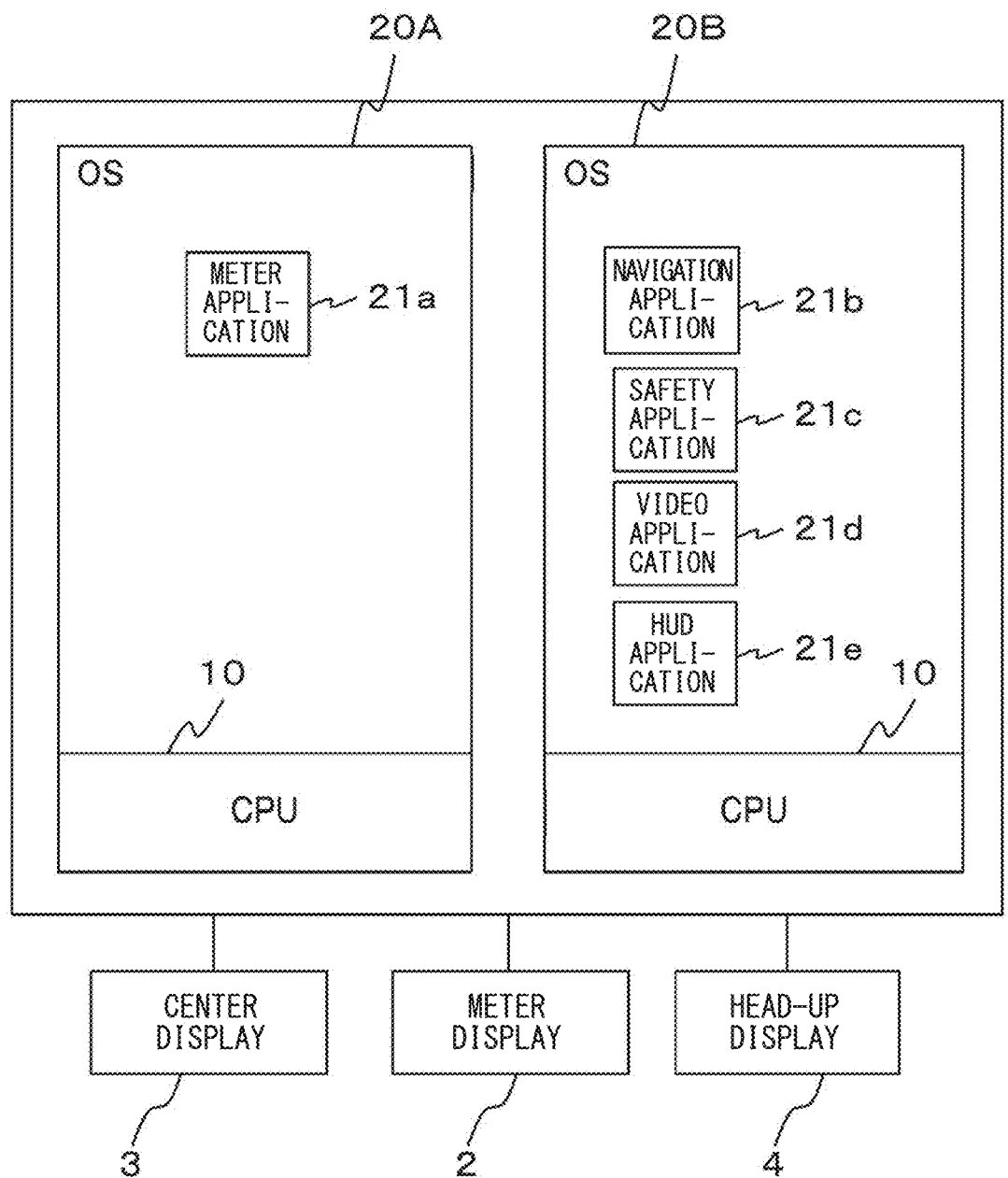
FIG. 11 is another diagram showing the other configuration example of the vehicle device.

Alternatively, as shown in FIG. 11, the vehicle device 1 includes multiple CPUs 10, and each of the OS 20A and the OS 20B is executed on a respective one of the CPUs 10. Similar applies to this case, in the CPU 10A, for example, the meter application 21a that requires real-time response is executed, and in the CPU 10B, the navigation application 21b, the safety application 21c, the video application 21d, the HUD application 21e, and the like that do not require real-time response as much as that on the CPU 10A side are executed. The number of the CPU 10 and the arrangement of the applications 21 are merely examples, and the present invention is not limited thereto.

Even when such a configuration is adopted, when the drawing is executed based on the multiple applications 21, the drawing requiring quick response can be preferentially processed, and the risk of shortage of the resources for another piece of drawing can be reduced.

Although in the present embodiment, the indicator images M1a and M2a of the meter or the warning light M3 is mainly described as an example of the image requiring the periodic update, the navigation screen M4, the home screen M5, the speed information M6, the time information M7, the course information M8, and the like are also included in the image requiring the periodic update.

Second Embodiment

Next, a second embodiment will be described. In the second embodiment, a further problem that occurs when preemption is executed on the GPU 13 and a method for solving the problem will be described. In order to simplify the description, the vehicle device 1, an OS 20, or an application 21 will be described with common reference numerals. Since the configuration of the vehicle device 1 is similar as that according to the first embodiment, the configuration will be described with reference to FIG. 2, 3, 10, 11, or the like. The flow of the drawing request processing is substantially similar as that according to the first embodiment, and thus will be described with reference to FIG. 8.

First, a further problem that occurs when preemption is executed on the GPU 13 will be described. As described above, the normal queue 13a and the priority queue 13b are provided for the GPU 13 to enable preemption. Accordingly, for the drawing request when the drawing is executed based on the multiple applications 21, the drawing requiring quick response can be preferentially processed, and the risk of shortage of the resources of the GPU 13 for another piece of drawing can be reduced.

Here, for example, displaying on the meter display 2 will be discussed. Since the meter display 2 is capable of providing full graphic display, a period required for updating the entire screen tends to be long. It is considered that it becomes more significant as definition and a size of the meter display 2 increase.

Figure 12:
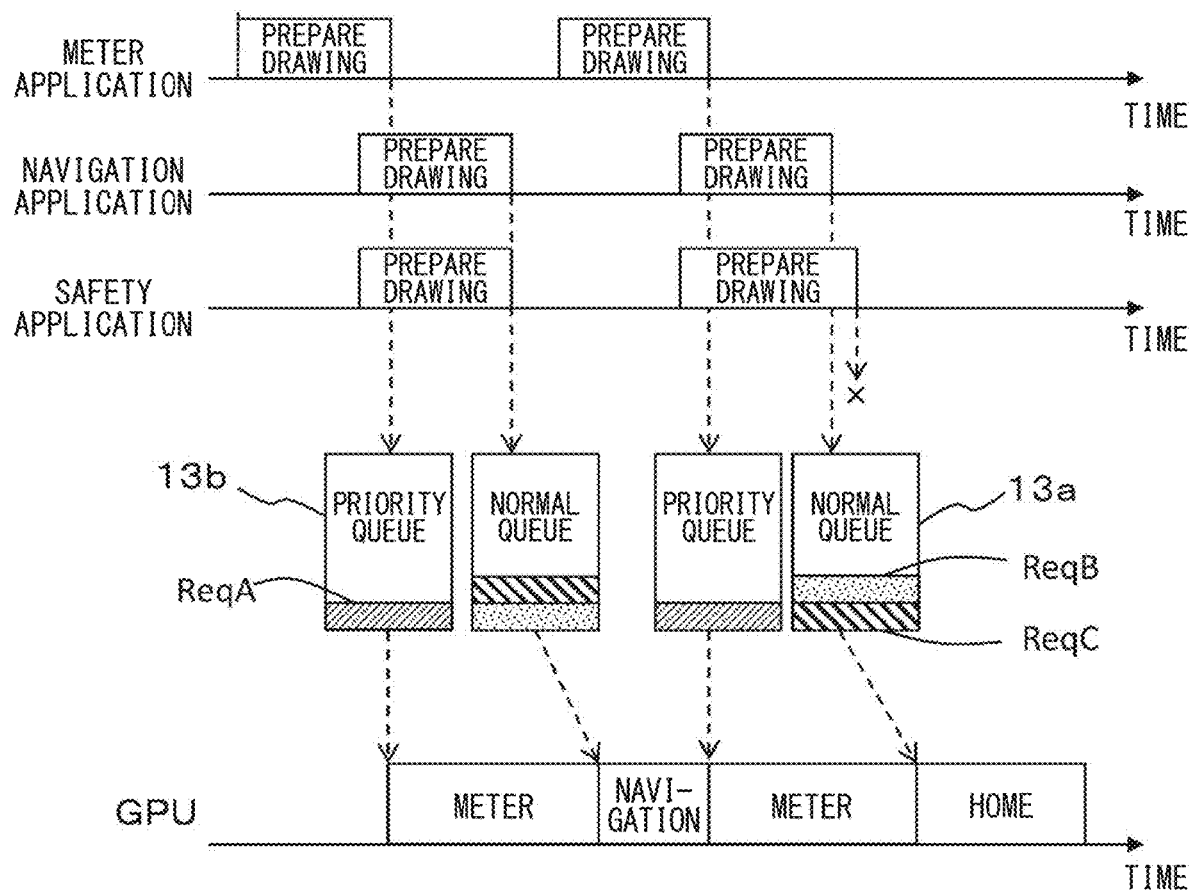
FIG. 12 is a diagram showing a problem at the time of preemption to a GPU according to a second embodiment.

Specifically, as a comparative example shown in FIG. 12, it is assumed that the drawing request from the meter application 21a is input to the priority queue 13b, and the drawing request from the navigation application 21b and the drawing request from the safety application 21c are input to the normal queue 13a almost at the same time. In this case, the GPU 13 first processes the drawing request input to the priority queue 13b, and then processes the drawing request input to the normal queue 13a in the round-robin fashion.

However, as described above, the meter application 21a inputs the drawing request to the priority queue 13b at a cycle of, for example, 1/60 seconds. Therefore, when the GPU 13 processes the drawing request from the meter application 21a and then processes the drawing request from the navigation application 21b, the drawing request from the meter application 21a may be input to the priority queue 13b again. In this case, since the GPU 13 preferentially processes the drawing request input to the priority queue 13b, processing the drawing request from the safety application 21c is postponed. At this time, even if a new drawing request is output from the safety application 21c while the GPU 13 is processing the drawing request from the meter application 21*a*, the previous drawing request from the safety application 21*c* remains in the normal queue 13*a*.

Therefore, as indicated by a symbol "x" in FIG. 12, the new drawing request is held without being input to the normal queue 13*a*. After processing the drawing request from the meter application 21*a*, the GPU 13 processes the drawing request from the safety application 21*c* input to the normal queue 13*a*.

As described above, when the drawing is executed based on the multiple applications 21 in one vehicle device 1 or when multiple display devices are controlled by the one vehicle device 1, even if the preemption on the GPU 13 is executed, there is a risk that the drawing request input to the normal queue 13*a* cannot be processed completely.

Therefore, in the present embodiment, the drawing request from each application 21 is processed as follows. The vehicle device 1 executes processing of specifying a priority portion shown in FIG. 13. Although the processing is executed on the application 21, for simplification of description, the vehicle device 1 is mainly used here. Subsequently, in step S2, the vehicle device 1 determines whether the drawing is for the priority portion.

Here, the priority portion is a portion to be preferentially updated in the entire screen to be updated. The priority portion corresponds to, for example, a portion in units of parts constituting the screen, or a portion in which a difference from the previously drawn screen occurs, that is, a portion for which drawing different from the previous drawing is necessary.

For example, in the case of the meter application 21*a*, it can be set such that the indicator image M1*a* of the speedometer M1 is set as the priority portion, and the scale image M1*b* is not set as the priority portion. Similarly, it can be set such that the indicator image M2*a* of the tachometer M2 is set as the priority portion, and the scale image M2*b* is not set as the priority portion. In the case of the warning light M3, all portions can be set as the priority portions.

Figure 15:
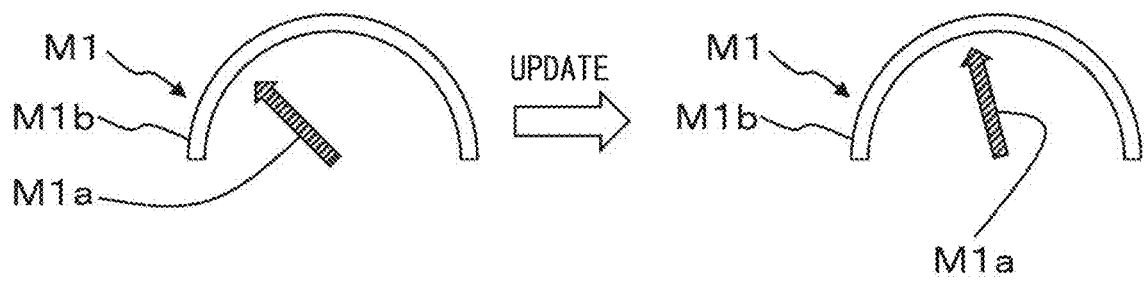
FIG. 15 is a diagram showing an example of a display update mode.

The indicator image M1*a* and the scale image M1*b* are portions that can be considered as parts when the speedometer M1 is displayed. As shown in FIG. 15, the position and the like of the indicator image M1*a* are changed before and after the update, while the scale image M1*b* is not substantially changed before and after the update. This is an example in the present embodiment, and in a display mode in which the indicator image M1*a* overlaps the scale image M1*b*, the scale image M1*b* may also change before and after the update.

In this regard, referring to the normal display mode shown in FIG. 4, it can be seen that the indicator image M1*a* of the speedometer M1, the indicator image M2*a* of the tachometer M2, and the warning light M3, which change before and after the update, are fairly small parts when viewed from the entire screen. Therefore, it can be expected that the period required for updating these priority portions can be significantly shortened as compared to the period required for updating the entire screen.

Therefore, the vehicle device 1 inputs a drawing request for an image to be displayed on the meter display 2 capable of providing full graphic display, and inputs at least one of the drawing requests for the meter indicator image M1*a*, the meter indicator image M2*a*, and the warning light M3 (in the present embodiment, both of the drawing requests) to the priority queue 13*b* as the priority portion.

Figure 13:
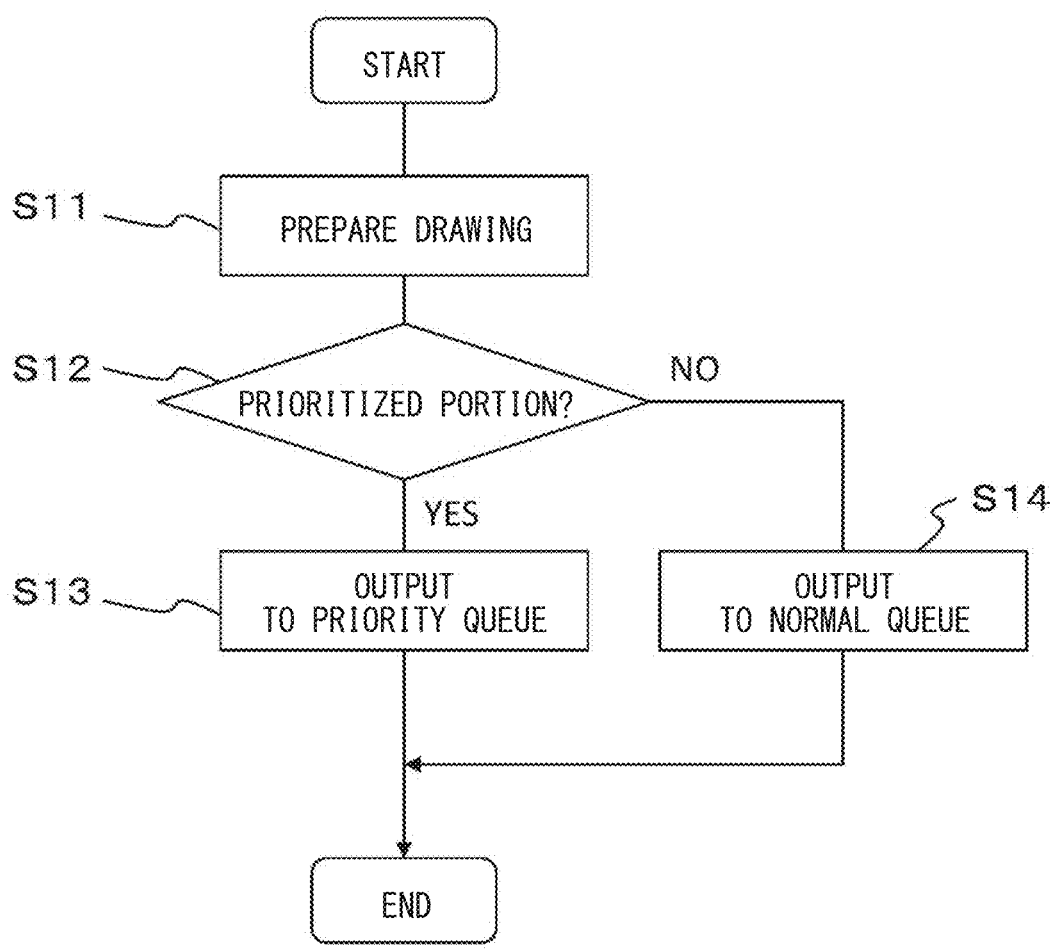
FIG. 13 is a diagram showing a flow of processing of specifying a priority portion.

More specifically, in the processing shown in FIG. 13, when the prepared image is a priority portion, the vehicle device 1 determines that the drawing request for the priority portion is executed. In this case, since YES is determined in step S12, the vehicle device 1 outputs the drawing request to the priority queue 13*b*. On the other hand, when the drawing request for the priority portion is determined to be not executed, the vehicle device 1 outputs the drawing request to the normal queue 13*a* since NO is determined in step S12.

Figure 14:
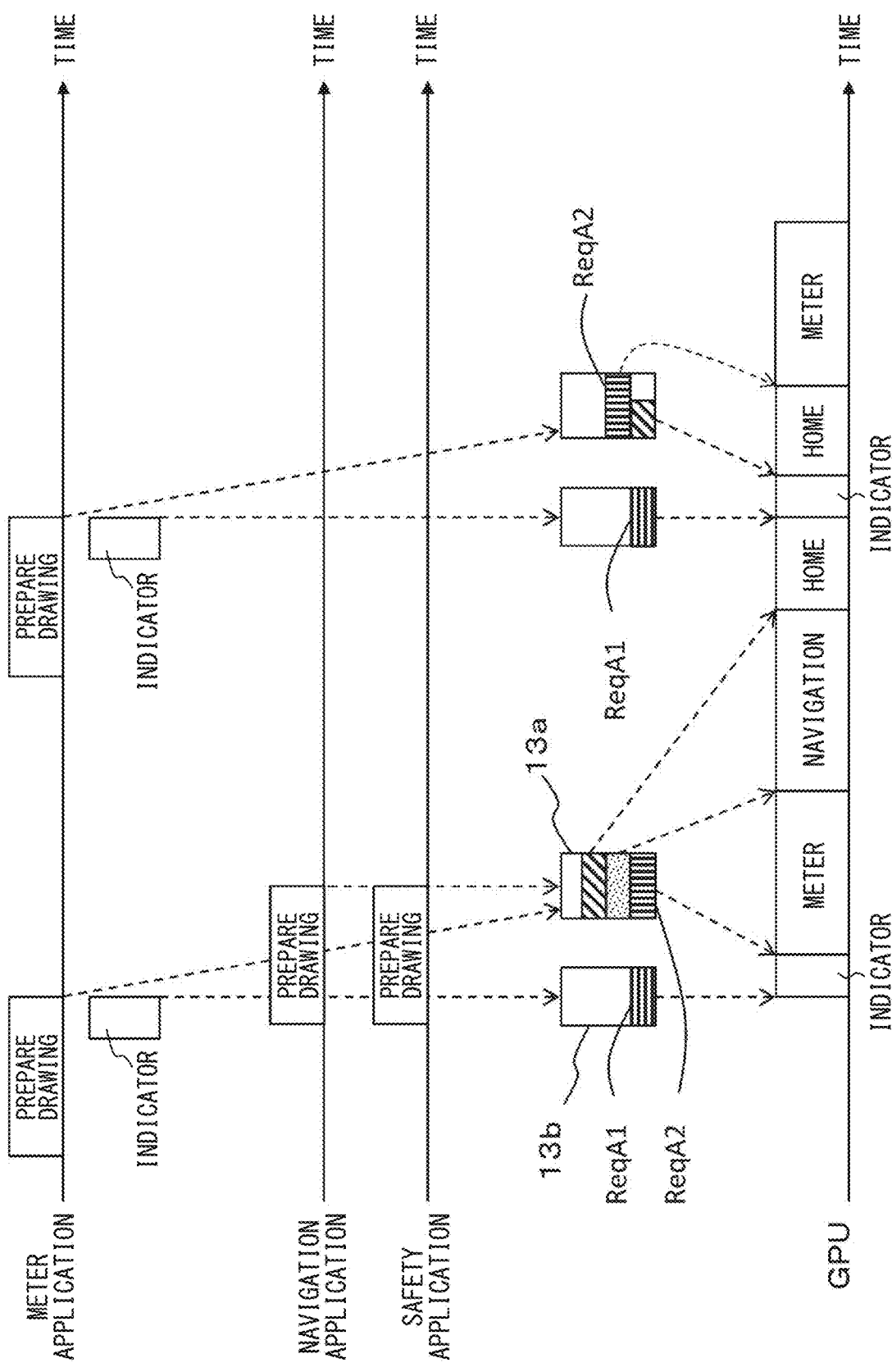
FIG. 14 is a diagram showing a mode of the preemption to the GPU.

As described above, the vehicle device 1 specifies, in the entire screen on which the drawing is executed by one application 21, the priority portion to be preferentially drawn, and divides the drawing request for the entire screen described as ReqA according to the first embodiment into a drawing request for the priority portion indicated as ReqA1 and a drawing request for the remaining portion indicated as ReqA2 in FIG. 14. Although "indicator" is shown in FIG. 14 for the sake of convenience, the drawing request for the priority portion also includes the drawing request for the warning light M3.

Then, the vehicle device 1 outputs the drawing request for the priority portion to the priority queue 13*b*, and outputs the drawing request for the other portions to the normal queue 13*a*. The vehicle device 1 uses a control method including processing of outputting the drawing request for the priority portion to the priority queue 13*b* and outputting the drawing request for the other portions to the normal queue 13*a*.

Accordingly, the GPU 13 can execute the drawing in response to the drawing request input to the priority queue 13*b*, that is, the drawing to be prioritized, in a shorter period of time as compared to when updating the entire screen. Since the drawing to be prioritized can be executed for a short period of time, it is possible to secure a margin when the drawing request input to the normal queue 13*a* is processed in the round-robin fashion, and to reduce a risk that the drawing request input to the normal queue 13*a* described with reference to FIG. 12 above cannot be processed completely.

According to the embodiment described above, following advantages can be attained.

Since the vehicle device 1 executes the preemption on the GPU 13, similar to the first embodiment described above, the drawing requiring quick response can be preferentially processed for a drawing request when the drawing is executed based on the multiple applications 21, and the risk of shortage of the resources of the GPU 13 for another piece of drawing can be reduced. Similar applies to the control method according to the present embodiment.

In the vehicle device 1, at least one of the multiple applications 21 specifies a priority portion to be preferentially processed in an image for which drawing is requested, inputs a drawing request for the priority portion to the priority queue 13*b*, and inputs a drawing request for a remaining portion other than the priority portion to the normal queue 13*a*.

Accordingly, the drawing to be prioritized can be executed for a short period of time, the margin during which the drawing request input to the normal queue 13*a* is processed in the round-robin fashion can be secured, and the risk that the drawing request input to the normal queue 13*a* cannot be processed completely can be reduced. That is, it is possible to process drawing having a high priority and drawing having a relatively low priority in consideration of, when priority is given to the one application 21, the influence on the other applications 21.

In the vehicle device 1, at least one of the multiple applications 21 inputs a drawing request for an image to be displayed on the meter display 2 capable of providing full graphic display, and inputs, as the priority portion, the drawing request of the portion corresponding to the indicator image M1*a* and the indicator image M2*a* of the meter to the priority queue 13*b*. In the vehicle device 1, at least one of the multiple applications 21 inputs an image for displaying a warning, that is, a drawing request of the warning light M3 to the priority queue 13*b*. Accordingly, the indicator image M1*a*, the indicator image M2*a*, and the warning light M3 that require periodic updating or quick response can be appropriately displayed, that is, updated.

Figure 16:
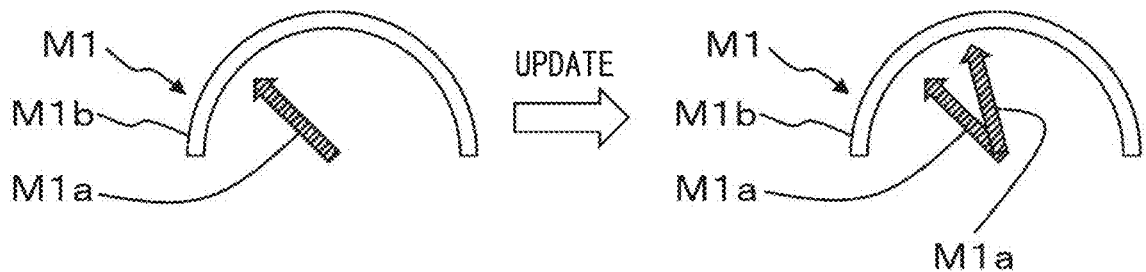
FIG. 16 is a diagram showing an example of another display update mode.
Figure 16:
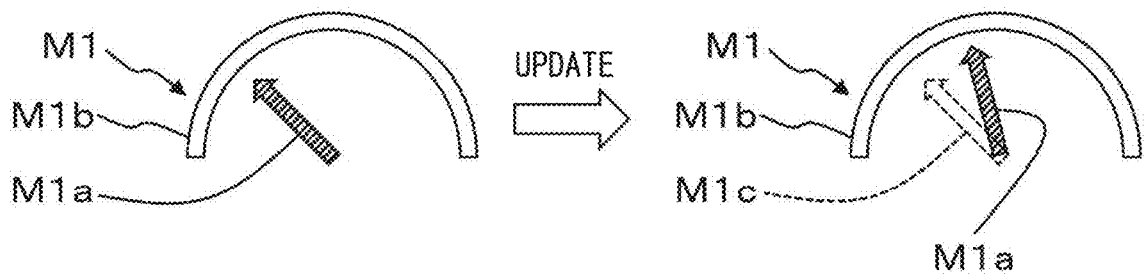

Although the priority portion can be appropriately updated by specifying the priority portion, there is a concern. For example, when a drawing request for the indicator image M1*a* of the speedometer M1 is input to the priority queue 13*b*, and drawing of other portions is input to the normal queue 13*a*, depending on the timing, as a comparative example shown in FIG. 16, the indicator image M1*a* may be displayed as an afterimage at the position before the update on the screen after the update. This is because the updated indicator image M1*a* is drawn preferentially and other images are updated later.

Therefore, when at least one of the multiple applications 21 inputs a drawing request for an image to be displayed on the meter display 2 capable of full graphic display, the vehicle device 1 is configured to input a drawing request for deleting the priority portion drawn last time to the priority queue 13*b*. With such a configuration, as the embodiment shown in FIG. 16, it is possible to erase the indicator image M1*a* at the position prior to the update as schematically shown by a dashed line, and to prevent the indicator image M1*a* from being displayed as an afterimage.

At this time, the priority portion drawn last time is a fairly small part of the screen as described above, and it is considered that there is little concern that the resources for the other applications 21 are insufficient for erasing. Since the priority portion previously drawn has already been drawn and does not need to be prepared again, an unnecessary increase in the load on the CPU 10 is also restricted. It is also possible to temporarily store a current state of the portion where the image requested to be drawn is arranged, and to erase the previously drawn area by drawing the stored portion when the drawing request is executed next time.

In the present embodiment, the indicator image M1*a*, the indicator image M2*a*, and the warning light M3 are mainly described as an example of the priority portion. However, for example, the course information M8 is information that is referred to during traveling, and it is considered that it is necessary to update the course information M8 at any time in accordance with the movement of the vehicle and the real-time property is also required. Therefore, the HUD application 21*e* can output the drawing request to the priority queue 13*b* using the course information M8 as the priority portion, and can output the other portions to the normal queue 13*a*. Here, similar applies to the other applications 21.

Third Embodiment

Next, a third embodiment will be described. In the third embodiment, another example of a drawing request input to a normal queue 13*a* and a priority queue 13*b* will be described. A configuration of a vehicle device 1 is common to that according to the first embodiment and the second embodiment.

For example, as shown for each application in FIG. 17, the vehicle device 1 can be configured to allocate priorities to multiple applications 21 in such a manner that, for example, the priority is higher as a numerical value is lower, input a drawing request from the meter application 21*a* or the like having a relatively high priority to the priority queue 13*b*, and input a drawing request from the navigation application 21*b* or the like having a relatively low priority to the normal queue 13*a*.

In this way, even with a configuration in which the priority is managed for each application 21, it is possible to simply manage the drawing request having a high priority and the drawing request having a relatively low priority. Of course, similar effects as those according to the first embodiment can be attained. For example, for the drawing request when drawing is executed based on the multiple applications 21, the drawing requiring quick response can be preferentially processed, and the risk of shortage of resources of a GPU 13 for another piece of drawing can be reduced.

When multiple OSs 20 are implemented as shown in FIGS. 10 and 11 described above, the vehicle device 1 can allocate priorities to the multiple OSs 20, inputting a drawing request from the OS 20 having a relatively high priority to the priority queue 13*b*, and inputting a drawing request from the OS 20 having a relatively low priority to the normal queue 13*a*, as shown for each OS in FIG. 18.

In this way, even with a configuration in which the priority is managed for each OS 20, it is possible to simply manage the drawing request having a high priority and the drawing request having a relatively low priority. Of course, similar effects as those according to the first embodiment can be attained. For example, for the drawing request when drawing is executed based on the multiple applications 21, the drawing requiring quick response can be preferentially processed, and the risk of shortage of resources of a GPU 13 for another piece of drawing can be reduced.

When the vehicle device 1 includes multiple CPU modules 16 as shown in FIG. 2, 10 or 11, the vehicle device 1 can allocate priorities to the multiple CPU modules 16, inputting a drawing request from the CPU module 16 having a relatively high priority to the priority queue 13*b*, and inputting a drawing request from the CPU module 16 having a relatively low priority to the normal queue 13*a*, as shown for each module in FIG. 19.

In this way, even with a configuration in which the priority is managed for each CPU module 16, the drawing request having a high priority and the drawing request having a relatively low priority can be simply managed. Of course, similar effects as those according to the first embodiment can be attained. For example, for the drawing request when drawing is executed based on the multiple applications 21, the drawing requiring quick response can be preferentially processed, and the risk of shortage of resources of a GPU 13 for another piece of drawing can be reduced.

When the vehicle device 1 includes multiple cores 10*a* as shown in FIG. 2, 10 or 11, the vehicle device 1 can allocate priorities to the multiple cores 10*a*, inputting a drawing request from the core 10*a* having a relatively high priority to the priority queue 13*b*, and inputting a drawing request from the core 10*a* having a relatively low priority to the normal queue 13*a*, as shown for each core in FIG. 19. When the vehicle device 1 includes multiple CPUs 10 as shown in FIG. 11 described above, the vehicle device 1 can allocate priorities to the multiple CPUs 10 as shown for each CPU in FIG. 19.

In this way, even with a configuration in which the priority is managed for each core 10*a* or each CPU 10, the drawing request having a high priority and the drawing request having a relatively low priority can be simply managed. Of course, similar effects as those according to the first embodiment can be attained. For example, for the drawing request when drawing is executed based on the multiple applications 21, the drawing requiring quick response can be preferentially processed, and the risk of shortage of resources of a GPU 13 for another piece of drawing can be reduced.

When the vehicle device 1 is connected to multiple display devices as shown in FIG. 1, 2, 10 or 11, the vehicle device 1 can allocate priorities to the multiple display devices, inputting a drawing request from the display device having a relatively high priority to the priority queue 13b, and inputting a drawing request from the display device having a relatively low priority to the normal queue 13a, as shown for each display device in FIG. 20.

In this way, even with a configuration in which the priority is managed for each display device, it is possible to simply manage the drawing request having a high priority and the drawing request having a relatively low priority. Of course, similar effects as those according to the first embodiment can be attained. For example, for the drawing request when drawing is executed based on the multiple applications 21, the drawing requiring quick response can be preferentially processed, and the risk of shortage of resources of a GPU 13 for another piece of drawing can be reduced.

Although the present disclosure has been described in accordance with the examples, it is understood that the present disclosure is not limited to the embodiments and the structures. The present disclosure includes various modifications and deformations within an equivalent range. In addition, various combinations and forms, and further, other combinations and forms including only one element, more than one element, or less than one element are also included in the scope and spirit of the present disclosure.

The control units and methods thereof described in the present disclosure may be implemented by a dedicated computer provided by constituting a processor and a memory that are programmed to execute one or more functions embodied by a computer program. Alternatively, the control units and the methods thereof described in the present disclosure may be implemented by a dedicated computer provided by constituting a processor by one or more dedicated hardware logic circuits. Alternatively, the control units and the methods thereof described in the present disclosure may be implemented by one or more dedicated computers constituted by a combination of a processor and a memory that are programmed to execute one or more functions and a processor constituted by one or more hardware logic circuits. The computer program may also be stored in a computer readable non-transitory tangible recording medium as a computer executable instruction.

The invention claimed is:

1. A vehicle device in which drawing is executed by a plurality of application programs, the vehicle device comprising:
   a graphic processing unit that draws a surface, which is image data to be displayed on a display device as a content, on at least one of a plurality of physical surfaces based on a drawing request from the plurality of application programs wherein the physical surfaces are storage areas formed on a memory and each of the physical surfaces is individually allocated to a respective one of the plurality of application programs;
   a normal queue to which a drawing command for the graphic processing unit is input; and
   a priority queue to which a drawing command of preferentially executing processing over the normal queue is input, wherein
   the graphic processing unit is configured to process the drawing command input to the normal queue in a round-robin fashion while preferentially processing the drawing command input to the priority queue.

2. The vehicle device according to claim 1, wherein at least one of the plurality of application programs inputs, to the priority queue, a drawing command for an image that needs to be periodically updated.

3. The vehicle device according to claim 1, wherein at least one of the plurality of application programs inputs, to the priority queue, a drawing command for an image for displaying a warning.

4. The vehicle device according to claim 1, wherein at least one of the plurality of application programs:
   specifies a priority portion to be preferentially processed in an image for which drawing is requested;
   inputs a drawing command for the priority portion to the priority queue; and
   inputs a drawing command for a remaining portion other than the priority portion to the normal queue.

5. The vehicle device according to claim 4, wherein at least one of the plurality of application programs:
   inputs a drawing command for an image to be displayed on a meter display configured to provide full graphic display; and
   inputs, as the priority portion, at least one of a drawing command for a portion in the image corresponding to an indicator of a meter and a drawing command for a portion in the image corresponding to a warning light of the meter to the priority queue.

6. The vehicle device according to claim 4, wherein at least one of the plurality of application programs:
   inputs a drawing command for an image to be displayed on a meter display configured to provide full graphic display; and
   inputs, to the priority queue, a drawing command for deleting the priority portion that has been drawn last time.

7. The vehicle device according to claim 1, wherein
   priorities are given to the plurality of application programs,
   a drawing command from the application program having a relatively high priority is input to the priority queue, and
   a drawing command from the application program having a relatively low priority is input to the normal queue.

8. The vehicle device according to claim 1, wherein
   a plurality of operating systems are implemented on the vehicle device, and
   priorities are given to the plurality of operating systems,
   a drawing command from the operating system having a relatively high priority is input to the priority queue, and
   a drawing command from the operating system having a relatively low priority is input to the normal queue.

9. The vehicle device according to claim 1, further comprising
   a plurality of CPU modules, wherein
   priorities are given to the plurality of CPU modules,
   a drawing command from the CPU module having a relatively high priority is input to the priority queue, and
   a drawing command from the CPU module having a relatively low priority is input to the normal queue.

10. The vehicle device according to claim 1, wherein
    a screen is output from each of a plurality of display devices, and
    priorities are given to the plurality of display devices, a drawing command corresponding to the display device having a relatively high priority is input to the priority queue, and a drawing command corresponding to the display device having a relatively low priority is input to the normal queue.

11. A control method of a vehicle device in which drawing is executed by a plurality of application programs, the method comprising, when drawing a surface, which is image data to be displayed on a display device as a content, on at least one of a plurality of physical surfaces based on drawing requests from the plurality of application programs:

preferentially processing a drawing command input to a priority queue over a drawing command input to a normal queue; and processing the drawing command input to the normal queue in a round-robin fashion, wherein the physical surfaces are storage areas formed on a memory and each of the physical surfaces is individually allocated to a respective one of the plurality of application programs.

12. A vehicle device in which drawing is executed by a plurality of application programs, the vehicle device comprising:

a graphic processing unit that executes drawing based on a drawing request from the plurality of application programs;

a normal queue to which a drawing command for the graphic processing unit is input; and a priority queue to which a drawing command of preferentially executing processing over the normal queue is input, wherein the graphic processing unit is configured to process the drawing command input to the normal queue in a round-robin fashion while preferentially processing the drawing command input to the priority queue, and at least one of the plurality of application programs:

specifies a priority portion to be preferentially processed in an image for which drawing is requested;

inputs a drawing command for the priority portion to the priority queue;

inputs a drawing command for a remaining portion other than the priority portion to the normal queue;

inputs a drawing command for an image to be displayed on a meter display configured to provide full graphic display; and inputs, as the priority portion, at least one of a drawing command for a portion in the image corresponding to an indicator of a meter and a drawing command for a portion in the image corresponding to a warning light of the meter to the priority queue.

13. A vehicle device in which drawing is executed by a plurality of application programs, the vehicle device comprising:

a graphic processing unit that executes drawing based on a drawing request from the plurality of application programs;

a normal queue to which a drawing command for the graphic processing unit is input; and a priority queue to which a drawing command of preferentially executing processing over the normal queue is input, wherein the graphic processing unit is configured to process the drawing command input to the normal queue in a round-robin fashion while preferentially processing the drawing command input to the priority queue, and at least one of the plurality of application programs:

specifies a priority portion to be preferentially processed in an image for which drawing is requested;

inputs a drawing command for the priority portion to the priority queue;

inputs a drawing command for a remaining portion other than the priority portion to the normal queue;

inputs a drawing command for an image to be displayed on a meter display configured to provide full graphic display; and inputs, to the priority queue, a drawing command for deleting the priority portion that has been drawn last time.

* * * * *